United States Patent [19]
Clark et al.

[11] Patent Number: 5,461,647
[45] Date of Patent: Oct. 24, 1995

[54] DRIVE TOOL FOR UPPER END FITTING LOCKING ARRANGEMENT

[75] Inventors: Darel R. Clark; D. Michael Minor, both of Lynchburg, Va.

[73] Assignee: B&W Fuel Company, Lynchburg, Va.

[21] Appl. No.: 298,813

[22] Filed: Aug. 31, 1994

[51] Int. Cl.⁶ ................................................. G21C 19/00
[52] U.S. Cl. ........................... 376/260; 81/176.15; 81/451
[58] Field of Search ..................................... 376/260, 261, 376/463; 81/176.1, 176.15, 176.2, 451, 461

[56] References Cited

U.S. PATENT DOCUMENTS

| | | | |
|---|---|---|---|
| 3,769,158 | 10/1973 | Winders | 376/446 |
| 3,828,868 | 8/1974 | Jabsen | 376/449 |
| 3,887,980 | 6/1975 | Yates et al. | 376/261 |
| 4,522,780 | 6/1985 | Shallenberger et al. | 376/260 |
| 4,548,103 | 10/1985 | Orban | 376/260 |
| 4,699,761 | 10/1987 | Gjertsen et al. | 376/261 |
| 5,056,386 | 10/1991 | Chaconas | 81/451 |
| 5,268,948 | 12/1993 | Church et al. | 376/446 |

*Primary Examiner*—Daniel D. Wasil
*Attorney, Agent, or Firm*—Robert J. Edwards; D. Neil LaHaye

[57] ABSTRACT

A tool for use with an integral reusable locking arrangement between the guide tubes and upper end fitting in a nuclear fuel assembly. A positioner on the tool locates the tool on the upper end fitting grillage and aligns a wrench on the tool with projections on a spring collar used in the locking arrangement. The wrench on the lower end of the tool has slots that engage with the reusable locking arrangement on the guide tube upon application of downward pressure on the tool driver. Rotation of the driver causes corresponding rotation of the spring collar on the reusable locking arrangement for locking or unlocking of the upper end fitting in place relative to the guide tubes. Axial and rotational motion of the driver is limited by interaction between a set screw on the positioner and slots in the driver. Upward motion of the driver disengages the wrench from the spring collar for removal of the tool.

2 Claims, 3 Drawing Sheets

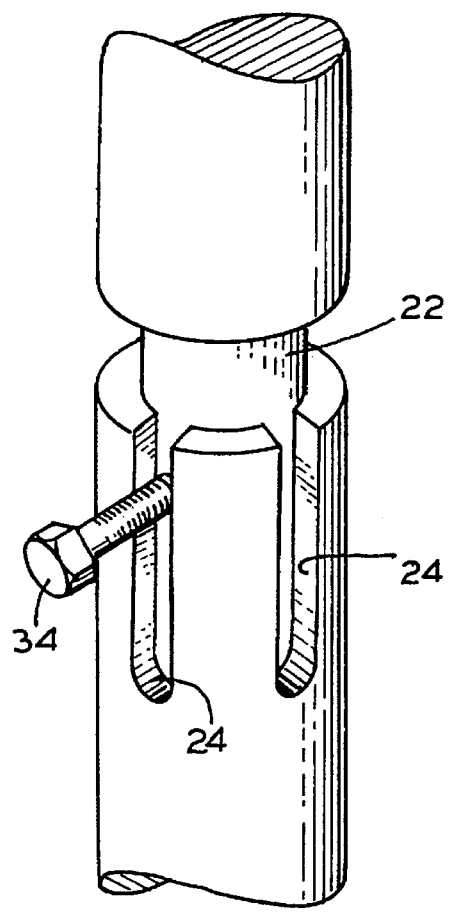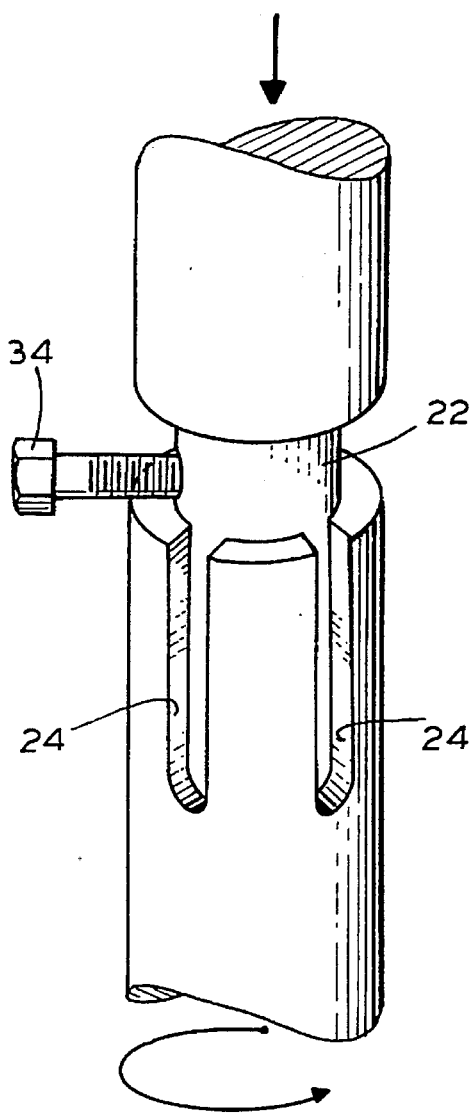

DRIVE TOOL FOR UPPER END FITTING LOCKING ARRANGEMENT

BACKGROUND OF THE INVENTION

1. Field of the Invention

The invention is generally related to nuclear fuel assemblies and more particularly to a tool for use of a quick disconnect attachment between the guide tube and upper end fitting.

2. General Background

In a nuclear reactor core, each fuel assembly is fitted with a number of guide tubes that are used to receive control rods. In the nuclear industry, the tubes that are used to receive control rods are referred to as guide tubes or thimble tubes and the upper internal structure that these tubes are attached to are referred to as an upper end fitting or a top nozzle, depending on the manufacturer. Therefore, it should be understood that references herein to a guide tube and upper end fitting should be considered as also referring to a thimble tube and top nozzle. The guide tubes have a relative thin wall thickness and thus require a sleeve at the upper end to provide the necessary support for attachment points and shoulder stops. During assembly, the guide tubes are inserted into the spacer grids. The upper end fitting is then aligned with, received on, and attached to the upper end sleeves of the guide tubes. Typically, upper end fittings and sleeves are attached to one another by the use of threaded joints and locking cups. When it becomes necessary to remove an irradiated fuel assembly upper end fitting or nozzle at the reactor site, the work must be done with remotely controlled tooling under water. This results in the handling of a number of parts and provides the potential for cross threading the fasteners during installation. The remote handling of a number of parts under water increases the potential for loose parts in the system that can damage the reactor and increases working time. Patents directed to nuclear fuel assembly end fitting retainers that applicant is aware of include the following.

U.S. Pat. No. 3,769,158 discloses the use of an end fitting over fuel rods where a reduced neck extending through the opening in the end fitting has resilient split rings in grooves and engage the end fitting.

U.S. Pat. No. 3,828,868 discloses guide tubes that are threadably attached to the end fitting.

U.S. Pat. No. 4,699,761 discloses the use of a threaded sleeve on the upper end of the guide tube.

U.S. Pat. No. 5,268,948 discloses a locking assembly for locking in place an upper support plate above a nuclear fuel bundle.

SUMMARY OF THE INVENTION

The invention addresses the above need. What is provided is a tool for use with an integral reusable locking arrangement between the guide tubes and upper end fitting in a nuclear fuel assembly. A positioner on the tool locates the tool on the upper end fitting grillage and aligns a wrench on the tool with projections on a spring collar used in the locking arrangement. The wrench on the lower end of the tool has slots that engage with the reusable locking arrangement on the guide tube upon application of downward pressure on the tool driver. Rotation of the driver causes corresponding rotation of the spring collar on the reusable locking arrangement for locking or unlocking of the upper end fitting in place relative to the guide tubes. Upward motion of the driver disengages the wrench from the spring collar for removal of the tool.

BRIEF DESCRIPTION OF THE DRAWINGS

For a further understanding of the nature and objects of the present invention reference should be had to the following description, taken in conjunction with the accompanying drawing in which like parts are given like reference numerals, and wherein:

FIG. 4 is a detail view of a section of the drive shaft the invention that illustrates the means for controlling motion of the drive shaft.

FIG. 5 is a detail view of the section of the drive shaft shown in FIG. 4 as the driver is forced down and rotated.

DETAILED DESCRIPTION OF THE PREFERRED EMBODIMENT

Figure 1:
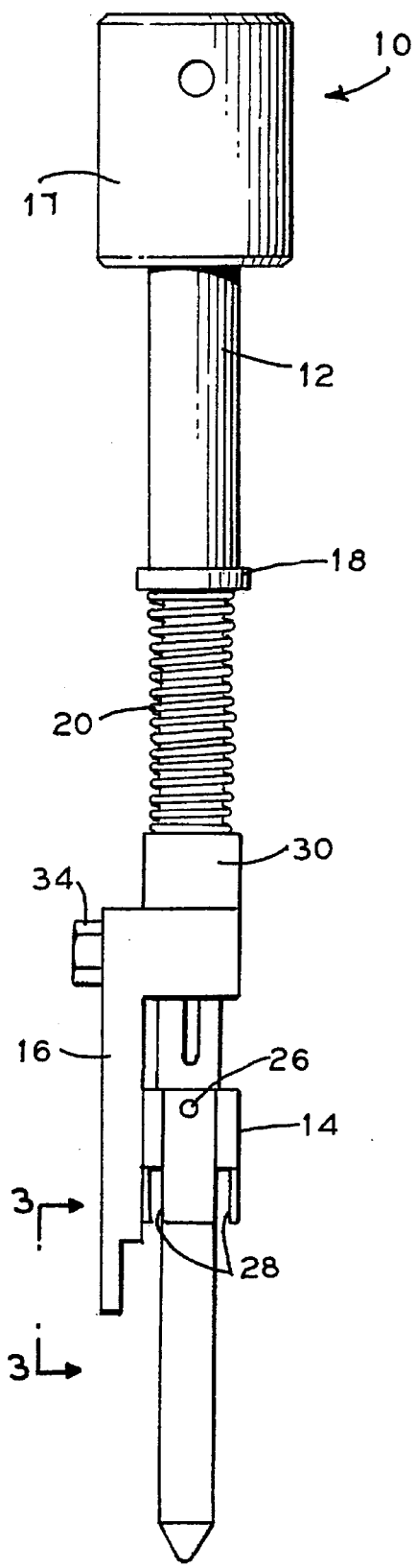
FIG. 1 is a side view of the invention.

Referring to the drawings, it is seen in FIG. 1 that the invention is generally indicated by the numeral 10. The invention is a drive tool for engaging and driving the reusable locking arrangement between the guide tubes and the upper end fitting illustrated in FIG. 6. Drive tool 10 is generally comprised of driver 12, wrench 14, and positioner 16.

Driver 12 is formed from a shaft with a first end that has a larger diameter than the remainder of the shaft. Drive head 17 is received on the first end of driver 12 to provide an attachment point for tool extensions. The transition to the smaller diameter forms a shoulder that accommodates a thrust washer 18 that is received on the shaft from the second end. Thrust washer 18 serves to help maintain spring 20 in its installed position over the narrower diameter of the shaft. A radial notch and axial slots in communication with the radial notch are provided a selected distance from the tapered end. Radial notch 22, best seen in FIGS. 4 and 5, is formed by a reduced diameter section. Four axial slots 24 are provided that begin at radial notch 22 and extend toward the second tapered end of the shaft. Axial slots 24 are spaced ninety degrees apart around the circumference of the shaft.

Figure 2:
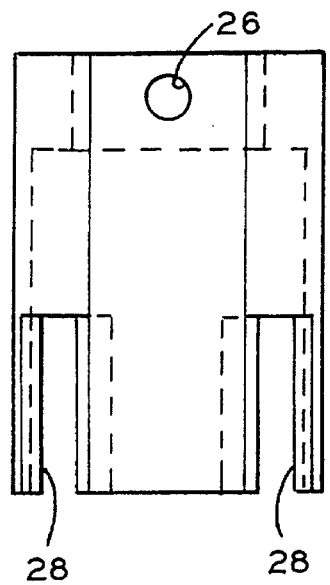
FIG. 2 is a side view of the wrench of the invention.

Wrench 14, seen in FIGS. 1 and 2, is attached to the shaft in a suitable manner such as by a roll pin 26 that is inserted through the shaft and wrench 14. This will result in corresponding rotation of wrench 14 with driver 12. Wrench 14 is provided with slots at its lower end, four in the preferred embodiment, that are equally spaced apart around the circumference. Slots 28 are sized to cooperate with the collar of the locking arrangement on the guide tubes and upper end fitting illustrated in FIG. 6 and will be further explained below.

Figure 3:
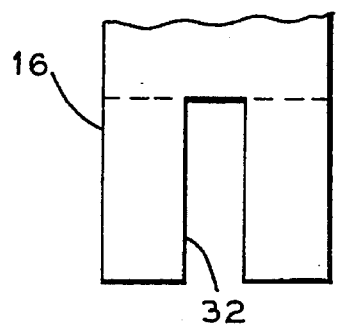
FIG. 3 is a view taken along lines 3—3 in FIG. 1.

Positioner 16, seen in FIG. 1, is attached to driver 12 at radial notch 22 and axial slots 24 for positioning wrench 14 and for allowing selected axial and rotational movement of driver 12 relative to positioner 16 when in position on the upper end fitting. The upper end of positioner 16 is provided with a circular bore sized to slidably and rotatably receive the shaft of driver 12. Bushing 30 is received on the shaft between positioner 16 and spring 20. The lower end of positioner 16, seen in FIG. 3, is provided with slot 32, the purpose of which will be explained below. Set screw 34 is threaded through positioner 16 so as to be slidably received in radial notch 22 and any of axial slots 24 depending upon the position of driver 12, as seen in FIGS. 4 and 5. This provides for movement of driver 12 relative to said positioner 16 between a first normal position where set screw 34 is located at the end of one of the axial slots 24 distant from the radial 22 notch and a second operational position where set screw 34 is located in the radial notch 22 for rotation of driver 12.

Figure 6:
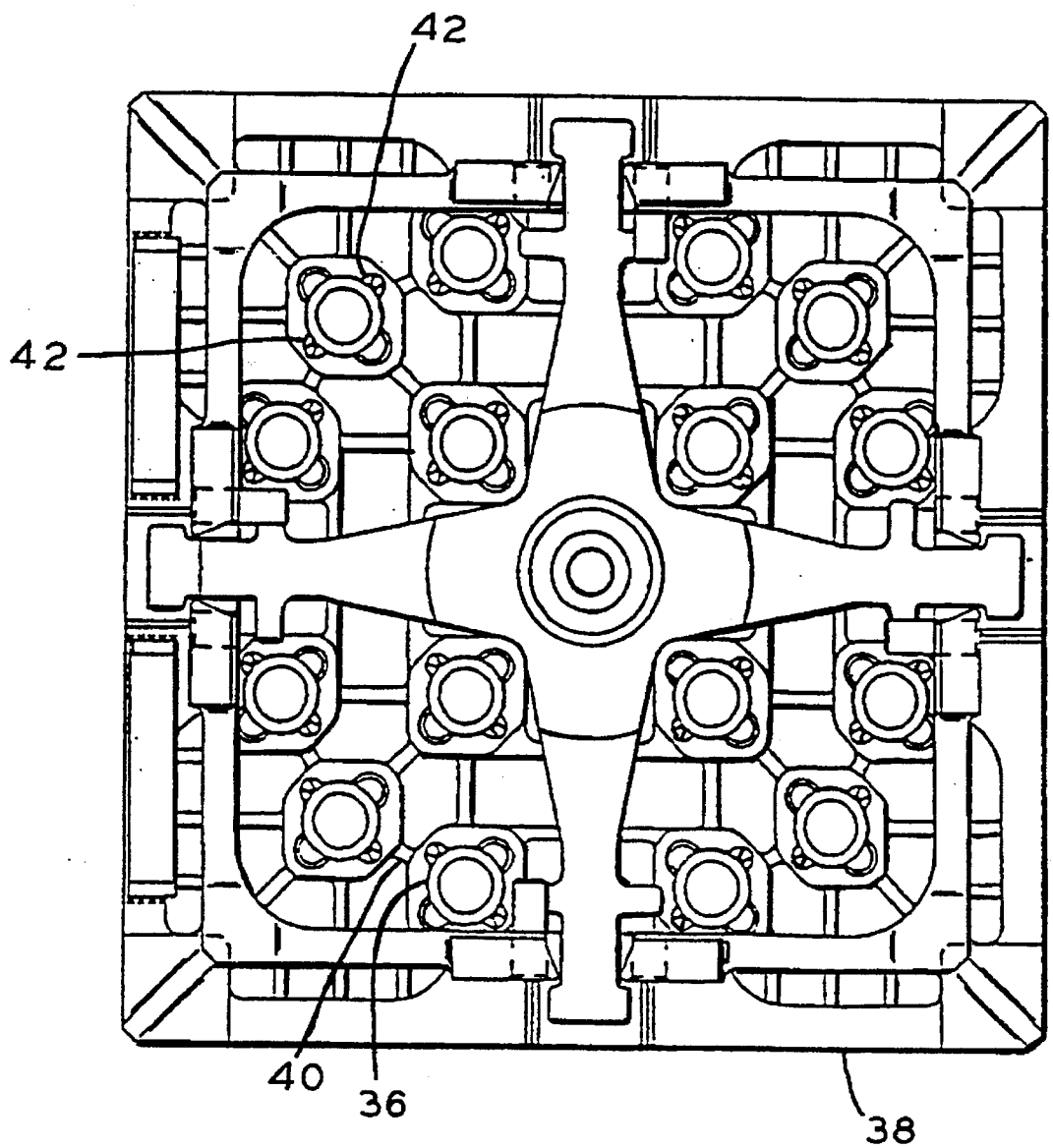
FIG. 6 is a plan view of an upper end fitting in place over guide tubes with the reusable locking arrangement in place.

In operation, the tapered end of driver 12 is inserted into the quick disconnect collar 36 seen in FIG. 6 with upper end fitting 38. Drive tool 10 is lowered until slot 32 on positioner 16 is seated on one of the grillages 40 and aligns slots 28 in wrench 14 with projections 42 on quick disconnect collar 36. Driver 12 is in its first normal position at this time. Downward pressure against spring 20 causes driver 12 to move to its second operation position and causes engagement of wrench 14 with projections 42. FIGS. 4 and 5 illustrate the operation of set screw 34 during downward movement of driver 12. Axial slots 24 interact with set screw 34 to prevent rotation of driver 12 until it has moved downwardly enough such that set screw 34 is received in radial notch 22, which then allows rotation of driver 12. Driver 12 is then rotated ninety degrees to unlock the quick disconnect collar 36 from upper end fitting 38. Spring 20 forces driver 12 back to its first normal position after ninety degrees of rotation unless downward pressure is maintained. This provides a means of positive indication to the operator that drive tool has been used properly to unlock or lock the quick disconnect collar 36 from the upper end fitting 38. It should be noted that FIG. 6 illustrates all quick disconnect collars 36 in the locked position and that drive tool 10 may be selectively used to rotate quick disconnect collars 36 between either their locked or unlocked positions on upper end fitting 38. This eliminates the need for separate tools for locking and unlocking the upper end fitting 38 in place as in the past. Interaction between set screw 34, slots 24, and notch 22 serve to prevent unwanted rotation of driver 12 when in the first normal position and to help provide positive ninety degree rotation during operation.

What is claimed as invention is:

1. A drive tool for an upper end fitting locking arrangement, comprising:

a. a driver formed from a shaft having a first end having a diameter larger than the remainder of the shaft and a second tapered end, said driver having a radial notch and a plurality of axial slots in communication with the radial notch at a selected distance from the tapered end;

b. a positioner rotatably and slidably received on said driver at the radial notch and axial slots;

c. a set screw that extends through said positioner and is received in the radial notch and axial slots in said driver whereby said driver is movable relative to said positioner between a first normal position where said set screw is located at the end of one of the axial slots distant from the radial notch and a second operational position where said set screw is located in the radial notch;

d. a spring received on said driver between said positioner and the larger diameter of said driver whereby said spring resiliently biases said driver toward said first normal position; and e. a wrench received on and attached to said driver between said positioner and the tapered end of said driver, said wrench having one end provided with equally spaced slots around the circumference.

2. The drive tool of claim 1, further comprising a drive head attached to the larger diameter end of said driver.

* * * * *